United States Patent
Kempf et al.

(10) Patent No.: US 9,423,072 B2
(45) Date of Patent: Aug. 23, 2016

(54) FLYING PLATFORM WITH VISUALLY TRANSPARENT FLEXIBLE SUPPORT MEMBERS

(71) Applicant: TAIT TOWERS MANUFACTURING, LLC, Lititz, PA (US)

(72) Inventors: James Kempf, Lititz, PA (US); Adam Davis, Leola, PA (US)

(73) Assignee: TAIT TOWERS MANUFACTURING, LLC, Lititz, PA (US)

( * ) Notice: Subject to any disclaimer, the term of this patent is extended or adjusted under 35 U.S.C. 154(b) by 0 days.

(21) Appl. No.: 14/801,896

(22) Filed: Jul. 17, 2015

(65) Prior Publication Data
US 2015/0323127 A1 Nov. 12, 2015

Related U.S. Application Data

(63) Continuation of application No. 14/174,923, filed on Feb. 7, 2014, now Pat. No. 9,109,741.

(51) Int. Cl.
*F16M 13/00* (2006.01)
*E04H 3/26* (2006.01)
*F16M 13/02* (2006.01)
*A63J 5/12* (2006.01)

(52) U.S. Cl.
CPC .............. *F16M 13/022* (2013.01); *A63J 5/12* (2013.01); *E04H 3/26* (2013.01); *F16M 13/00* (2013.01)

(58) Field of Classification Search
CPC ............... A63J 5/00; A63J 5/02; A63J 5/12; A63G 19/00; A63G 19/20; A63G 31/00; A63G 31/16; F16M 13/00; E04H 3/26
USPC ......................................... 472/59, 68, 74–81
See application file for complete search history.

(56) References Cited

U.S. PATENT DOCUMENTS

| | | | | | |
|---|---|---|---|---|---|
| 1,388,130 | A | * | 8/1921 | Thompson | A63J 13/00 472/60 |
| 4,244,136 | A | * | 1/1981 | Kublan | A63H 11/04 248/331 |
| 5,354,268 | A | * | 10/1994 | Gaughan | A63J 5/12 472/68 |
| 6,718,696 | B2 | * | 4/2004 | Silberman | E04H 3/14 472/77 |
| 8,398,449 | B2 | * | 3/2013 | Forti | A63H 7/02 244/153 R |
| 2012/0298937 | A1 | * | 11/2012 | Fisher | B66C 11/16 254/283 |

* cited by examiner

*Primary Examiner* — Kien Nguyen
(74) *Attorney, Agent, or Firm* — McNees Wallce & Nurick, LLC

(57) ABSTRACT

A suspended flying system having a load suspended by a plurality of flexible support members. The plurality of flexible support members are attached to a first rotational element attached to the load and a second rotational element attached to a support. The system also includes a motor operably connected to the first rotational element providing sufficient motion to the plurality of flexible support members to render the flexible support members visually transparent, the load being movable within a space. A method for suspending a load from visually transparent flexible support members is also disclosed.

17 Claims, 14 Drawing Sheets

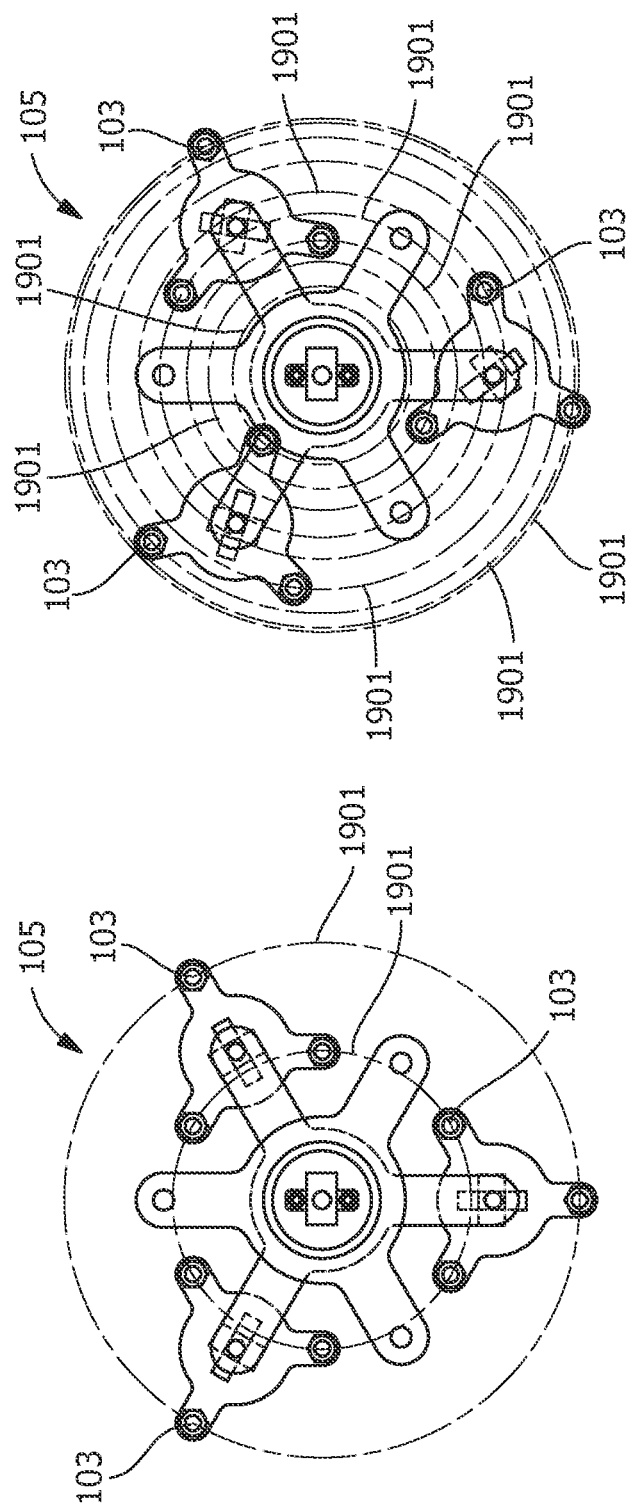

FLYING PLATFORM WITH VISUALLY TRANSPARENT FLEXIBLE SUPPORT MEMBERS

FIELD OF THE DISCLOSURE

The present disclosure generally relates to suspended systems for entertainment or other theatrical events having wire supports and processes involving suspended system. More specifically, the present invention relates to platforms or other structures suspended by flexible support members that are rendered visually transparent to an audience.

BACKGROUND OF THE DISCLOSURE

In certain performance or theatrical presentations, it is desirable to hang people, scenery, platforms or other structures to provide an illusion of flying or hovering in space. These visual effects are provided by suspending the people, scenery, platforms or other structures from wires attached to a support above the suspended load. However, these systems are constrained in their movement and often have visual appearances that are undesirable or otherwise unconvincing to the audience.

For example, when a platform is suspended from cables, the cables are often visible to the audience. Suspended systems, such as platforms, are often suspended by four wires that are painted or otherwise colored matte black to reduce the visibility. However, such wire systems can be seen at certain angles and when lighting or visual effects are utilized.

Alternatively, controlled motion of a system can be desirable. Although movement of a platform can compromise safety, such movement can be incorporated into a theatrical presentation, a repetitive process such as repositioning of items or loads, or other suitable controlled motions.

What is needed is a system and process capable of suspending and moving a load, platform or other structures wherein the flexible support members are not visible to an audience.

SUMMARY OF THE DISCLOSURE

One embodiment includes a suspended flying system having a load suspended by a plurality of flexible support members. The plurality of flexible support members are attached to a first rotational element attached to the load and a second rotational element attached to a support. A motor is operably connected to the first rotational element to provide sufficient motion to the plurality of flexible support members to render the flexible support members visually transparent. The load is movable within a space.

Another embodiment includes a method for suspending a load from visually transparent flexible support members. The method further includes suspending a load from a plurality of flexible support members, the plurality of flexible members being attached to a first rotational element attached to the load and a second element attached to a support. The method further includes moving the plurality of flexible support members at a sufficient speed and over a sufficient distance to render the flexible support members visually transparent. The method further includes moving the load within a space.

A further embodiment includes a suspended flying system having a load suspended by a plurality of flexible support members. The plurality of flexible support members is attached to a first rotational element attached to the load and a second rotational element attached to a support. a motor is operably connected to the first rotational element to provide sufficient motion to the plurality of flexible support members to render the flexible support members visually transparent. The load is movable by the system within a space with pitch, yaw and roll.

Further aspects of the method and system are disclosed herein. The features as discussed above, as well as other features and advantages of the present disclosure will be appreciated and understood by those skilled in the art from the following detailed description and drawings.

BRIEF DESCRIPTION OF THE DRAWINGS

FIG. 19 shows a top view of an second rotational element of a suspended flying system according to another exemplary embodiment of the disclosure.

FIG. 20 shows a top view of an second rotational element of a suspended flying system according to another exemplary embodiment of the disclosure.

Wherever possible, the same reference numbers will be used throughout the drawings to represent the same parts.

DESCRIPTION OF THE DISCLOSURE

Provided is a system and process of suspending a load, such as a platform, scenery, performer or other structure with flexible support members wherein the flexible support members suspending the load are not visible to the audience, the load being movable in multiple directions within a space.

Figure 1:
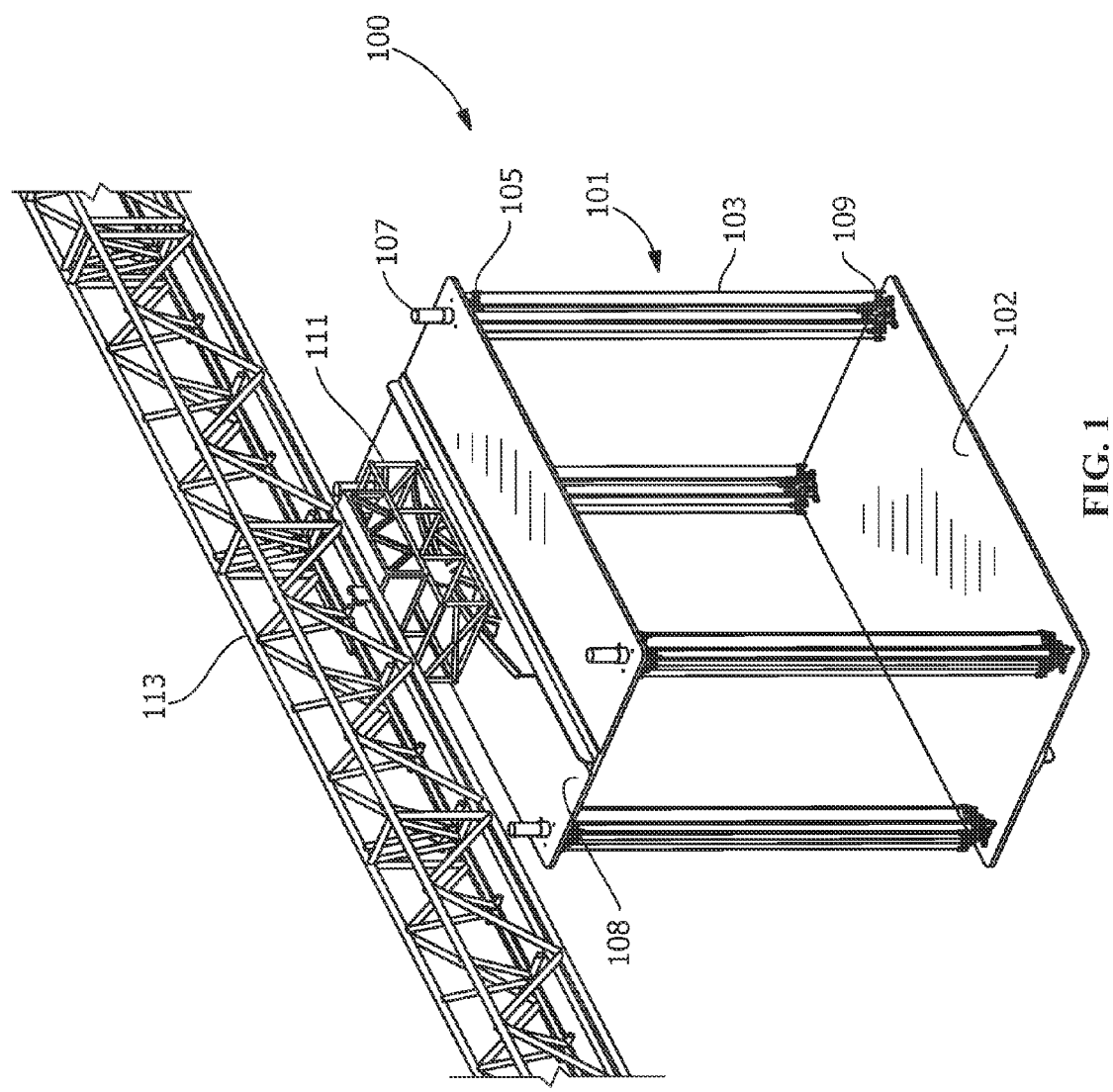
FIG. 1 shows an perspective view of a suspended flying system according to an exemplary embodiment of the disclosure.

FIG. 1 shows a suspended flying system 100 according to the present disclosure. The suspended flying system 100 includes four suspension columns 101 that are capable of rendered visually transparent upon sufficient motion of the flexible support members 103. The suspension column 101 is made up of a grouping of flexible support members 103 that are rotatable about an axis. As utilized herein, "visually transparent" is a state where the flexible support members 103, when in motion, are not visible or not easily perceptible to an observer as viewed from a position of an audience, camera or other position from which a performance may be viewed. While it is desirable to have the flexible support members 103 be fully visually transparent, partially transparent or translucent moving flexible support members 103 that are not easily observed by the viewer are "visually transparent".

While the system 100 shown in FIG. 1 includes four suspension columns 101, any number of columns may be used to provide a flying effect for a load 102. In FIG. 1, the load 102 is a platform, but is not so limited and may include a person, scenery, equipment or any other structure for which suspended flying is desired. The suspension columns 101 include a plurality of flexible support members 103 that are movable. While FIG. 1 shows nine flexible support members 103 per suspension column 101, any number of flexible support members may be used. A greater number of flexible support members 103 allow greater capacity for weight and reduced required diameter for the flexible support members 103. Reducing diameter flexible support members 103 permit reduced motion to make the flexible support members 103. Larger diameter flexible support members 103 require greater motion to render them visually transparent. Flexible support members 103 may be fabricated from any suitable material for supporting the load 102. Suitable materials include carbon steel wire (e.g., piano wire), Aramid fibers, Vectran fibers, carbon fibers, UHMWPE fibers (Dyneema or Spectra) or any other flexible material suitable for suspending load 102. In addition, flexible support members 103 may be coated or painted to further reduce visibility. For example, the flexible support members 103 may be painted matte black or coated with gun blue. In one embodiment, the system 100 includes nine flexible support members 103 per suspension column 101 formed of 1/32 inch Vectran fiber dyed flat black, which have tighter bend radius while similar strength to piano wire.

As shown in FIG. 1, flexible support members 103 are attached to second rotational element 105 and first rotational element 109. In the embodiment shown in FIG. 1, the suspension columns 101 are rendered visually transparent by motion of the flexible support members 103 in a rotational direction. The motion of the flexible support members 103 is provided by the second rotational element 105 and first rotational element 109. While both an second rotational element 105 and a first rotational element 109 are shown, the motion of the flexible support members 103 may be provided by other arrangements of rotational elements, including a single rotational element. The second rotational element 105 is driven by motor 107. The second rotational element 105 and the motors 107 are supported on a support platform 108. Motor 107 provides rotary motion to the second rotational element 105, which results in corresponding rotational motion of the first rotational element 109. In other embodiments, the second rotational element provides vibratory motion or oscillatory motion. In the embodiment shown in FIG. 1, the first rotational element 109 is free-wheeling on bearings, but in other embodiments may be driven by a motor or similar device.

While not so limited, in one embodiment, the suspension column 101 is rotated at a speed of 350 to 1200 rpm. At lower speeds the suspension column 101 becomes more visible and at higher speeds the suspension column 101 begins to generate noise. A particularly suitable rotation speed for rendering the flexible support member visually transparent includes a rotational speed of about 1000 rpm.

Further motion of the system 100 is provided by the trolley 111, which is driven by a motor or a winch along support truss 113. In other embodiments the trolley 111 and/or truss 113 may also be moved or driven to provide additional directional movements for the system 100. In one embodiment a crane-like structure with a swing arm provides structural support to the truss 113 and the trolley 111 and allows greater freedom of movement of the system 100. The trolley 111 may also includes devices for drawing up and/or deploying the flexible support members 103 to provide the desired motion and/or visual effect. While FIG. 1 shows the system 100 with truss 113 and trolley 111, the bracket may also attach to an alternate moving support system, such as a lift or crane to provide desired motion of visual effect. The trolley 111 and the associated structure facilitate motion of the support platform 108 and the load 102 within a space. For example, the load 102 may be moved within a space, such as a theater space with motion including forward and backward linear motion with pitch, yaw and roll of the load 102.

Figure 2:
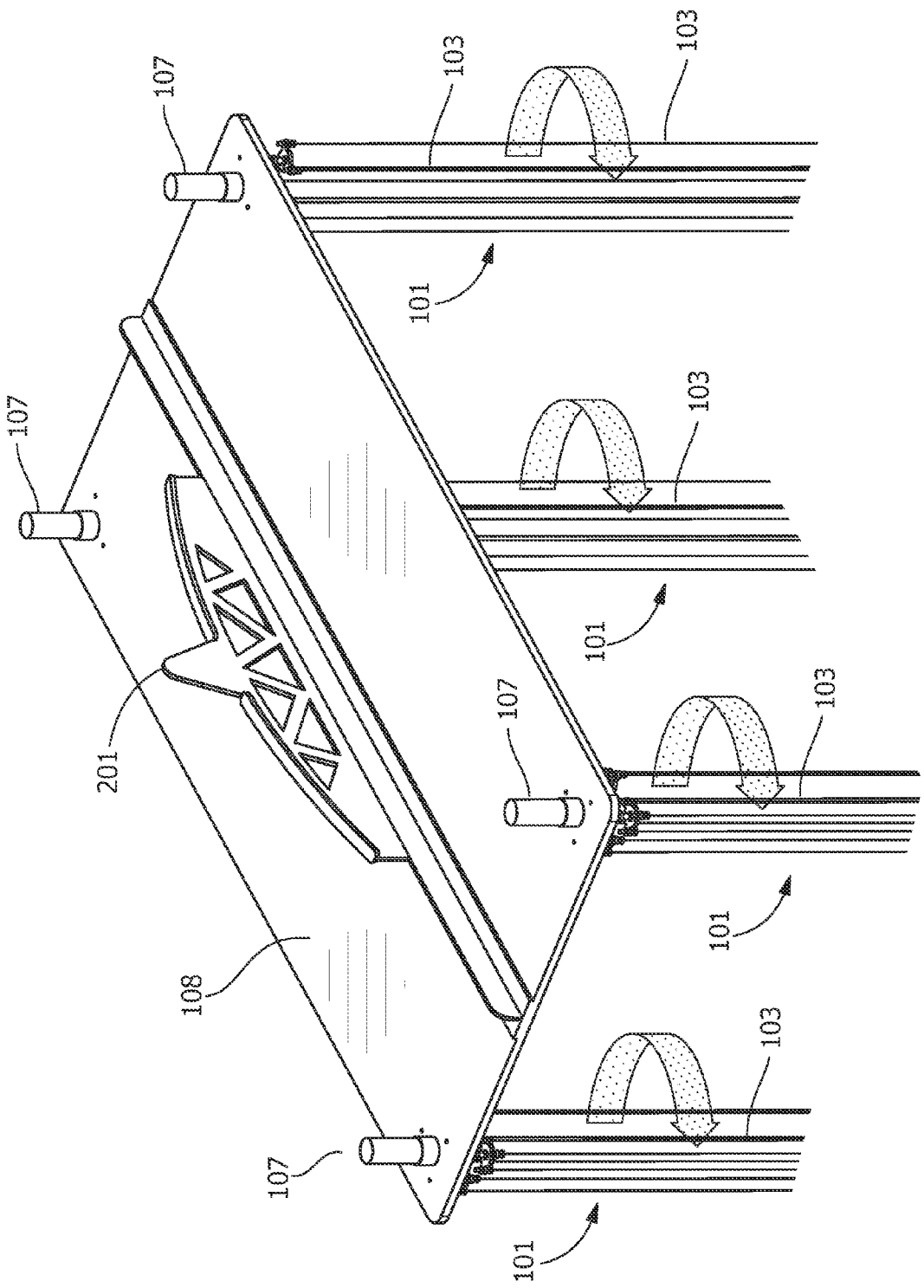
FIG. 2 shows a perspective view of a portion of a suspended flying system according to an exemplary embodiment of the disclosure.

FIG. 2 shows a portion of system 100. As shown in FIG. 2, the support platform 108 is attachable to trolley 111 (shown in FIG. 1) by bracket 201. The support platform 108 is not limited to the structure shown and may include any suitable arrangement of support structures for motor 107 and suspension column 101. To facilitate movement of the load 102 within a space, the support platform 108 may be moved, pivoted, rotated or otherwise moved to provide corresponding motion of the load 102.

Figure 3:
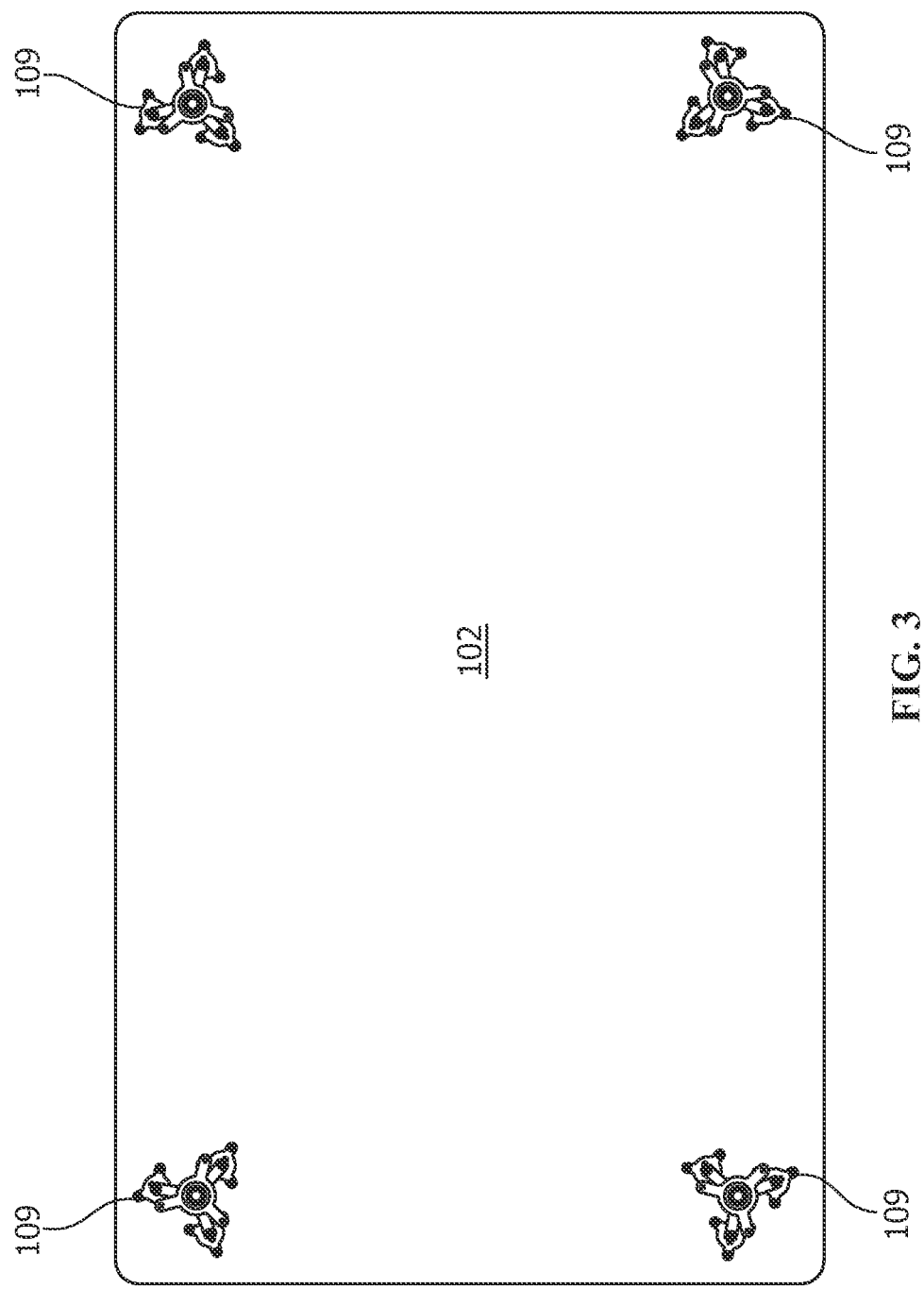
FIG. 3 shows a top view of a load of a suspended flying system according to an exemplary embodiment of the disclosure.

FIG. 3 shows a top view of load 102 with the placement of first rotational elements 109. As shown in FIG. 3, the first rotational elements 109 may be placed at the corners of the load 102. However, the placement of the first rotational elements 109 is not so limited and may include placement along the edges or in locations in the center providing support. Likewise, the number of first rotational elements 109 is not limited to four and may include any number that is capable of providing suspended support to load 102. In one embodiment, as shown in FIG. 3, first rotational elements 109 are gimbal structures that are pivotable and freely rotatable. In another embodiment, the first rotational element 109 is driven by a motor or similar structure to provide rotation to flexible support members 103 and suspension column 101. In one embodiment, the first rotational element 109 includes a sensor or encoder to measure rotation. The rotation may be measured and compared to the rotation of the second rotational element 105 for safety and performance. In these embodiments, an emergency stop or other operational mode may be activated upon a deviation from the rotation at the second rotational element 105 and the first rotational element 109. In one embodiment, first rotational element 109 includes an absolute encoder that is battery powered and wirelessly controlled. First rotational elements 109 are pivotable such that the angle of the wires and suspension column 101 may extend at various angles from the load 102, particularly when the load is directed upwards or downwards (e.g., for pitching, yawing, or rolling) for particular visual effects. Flexible support members 103 attach to portions of the first rotational element 109 such that the flexible support members 103 form suspension column 101 and corresponds to the second rotational element 105. In one embodiment, the system 100 includes four second rotational elements 105, one at each corner of load 102 that can be controlled individually for straight lift, pitch, roll, and/or, yaw as needed.

Figure 4:
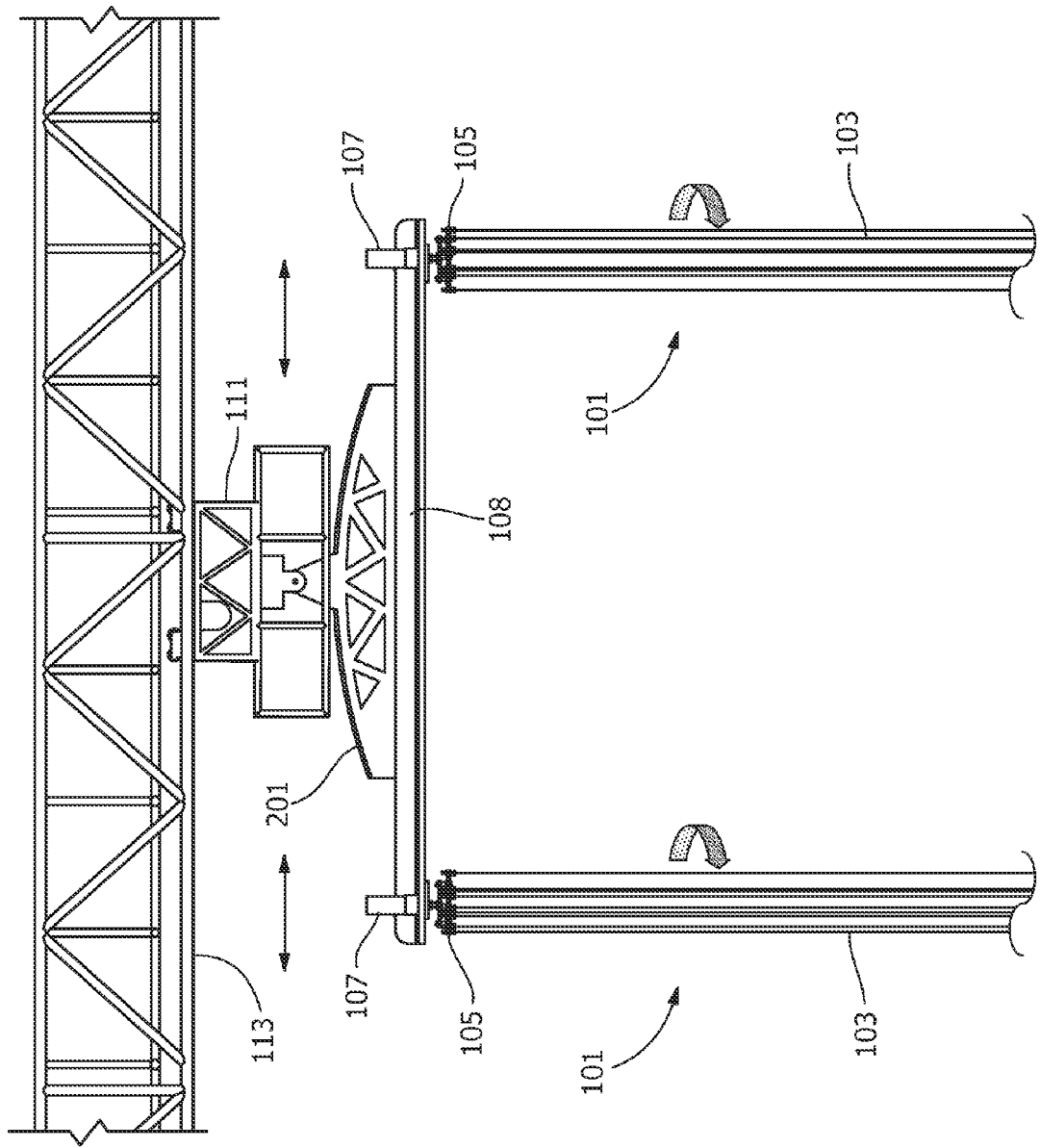
FIG. 4 shows a side view of a portion of a suspended flying system according to an exemplary embodiment of the disclosure.

FIG. 4 shows a side view of the system 100 wherein the suspension columns 101 are shown and rotation is shown. As shown in FIG. 4, the second rotational element 105 are operable connected to a motor 107 mounted on the support platform 108. While not so limited, the second rotational elements 105 include a gimbal structure similar to the structure of first rotational element 109. The gimbal structure is driven by motor 107 and is pivotable to allow alteration of the angle of the suspension column 101 to the support platform 108. Motion along truss 113 includes a linear motion along the truss 113. While the motion is shown as a linear motion, other motion, including rotational or pivotable motion may be provided by a crane or pivotable support extending on trolley 111. Trolley 111 is driven by a motor mounted on the trolley 111 or by wires driven by winches or other suitable device capable of providing motion to trolley 111.

Figure 5:
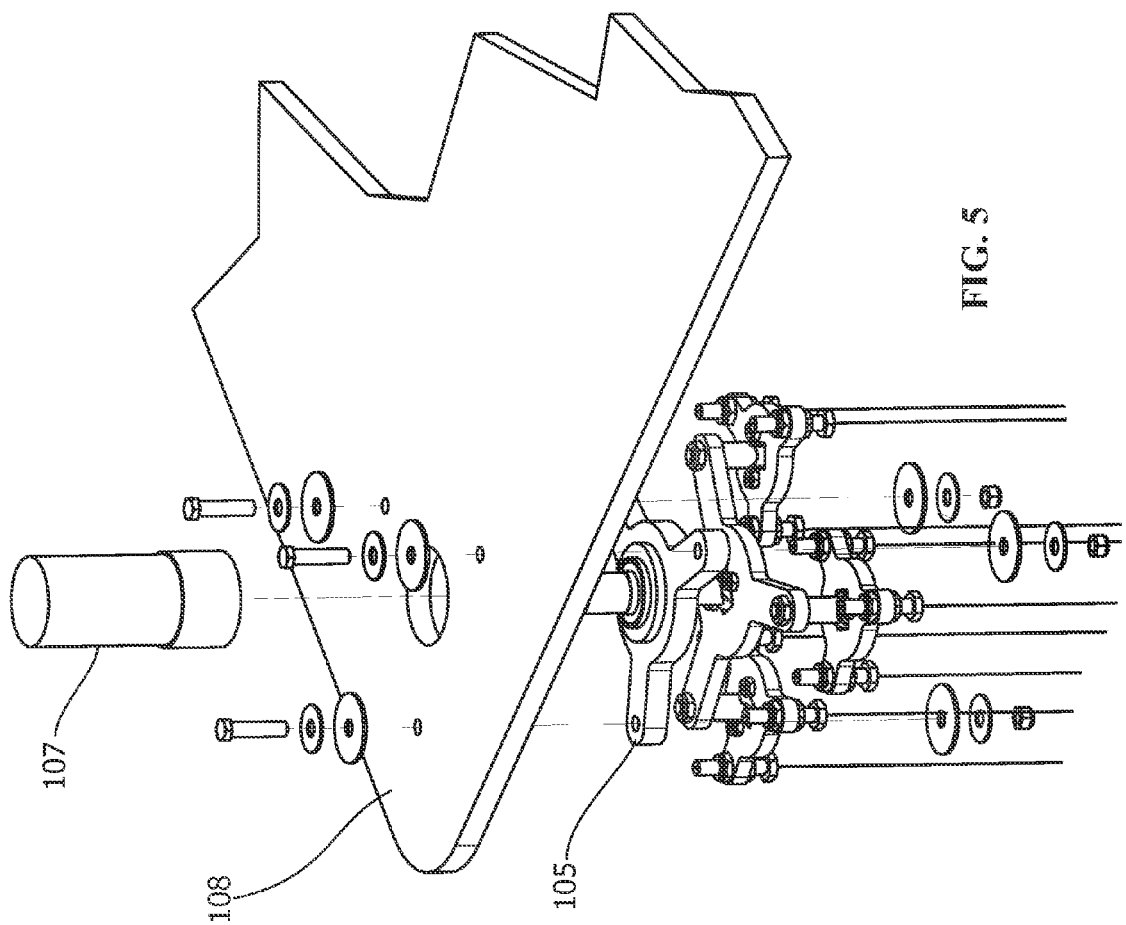
FIG. 5 shows an exploded view of a portion of a suspended flying system according to an exemplary embodiment of the disclosure.
Figure 6:
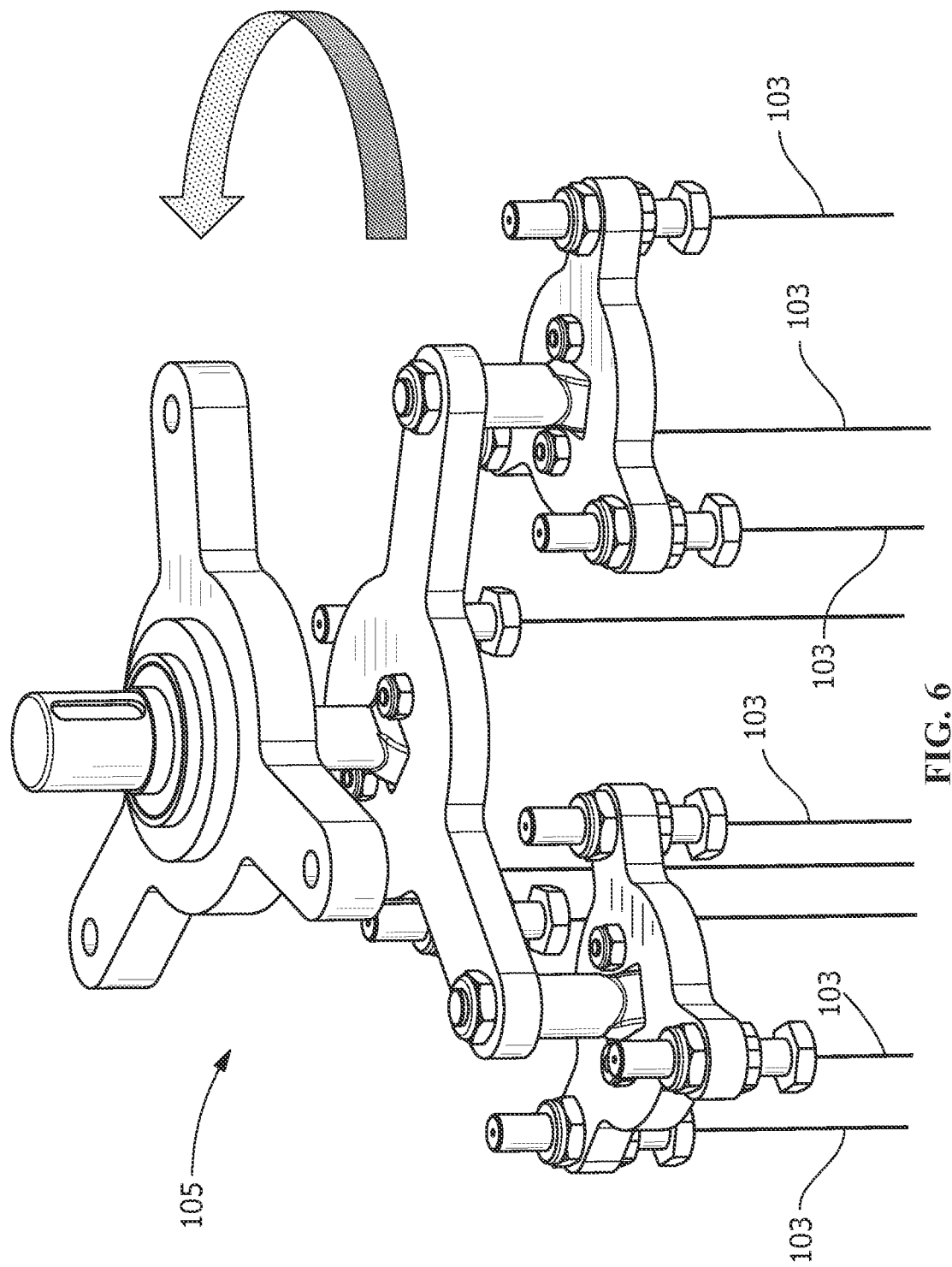
FIG. 6 shows a perspective view of an second rotational element of a suspended flying system according to an exemplary embodiment of the disclosure.
Figure 7:
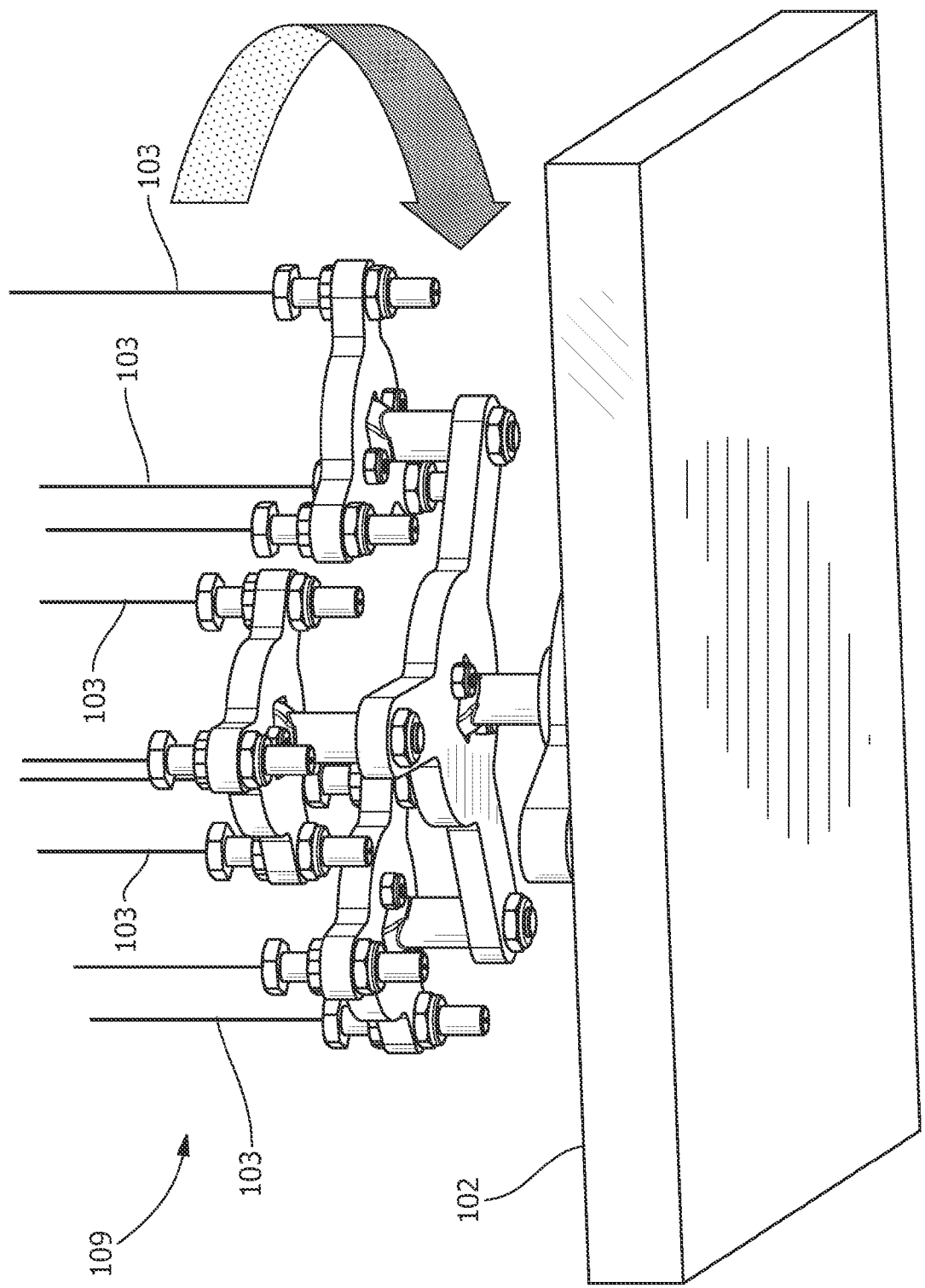
FIG. 7 shows a perspective view of a first rotational element of a suspended flying system according to an exemplary embodiment of the disclosure.

FIG. 5 shows an exploded view of the second rotational element 105 attached to the motor 107. In the embodiment shown, the second rotational element 105 extends through the support platform 108 and engages the motor 107. FIGS. 5 and 6 show the gimbal structure of the second rotational element 105 is visible showing the arms and the attachment of the flexible support members 103 to the second rotational element 105. FIG. 6 shows a perspective view of the second rotational element 105 of the suspension column 101 removed from the support platform 108. The gimbal structure includes bearings and pivot structures that allow rotation and pivot of the arms attaching to the flexible support members 203. As shown, each grouping of flexible support members 103 on second rotational element 105 are capable of pivoting. The structure of second rotational element 105 corresponds to first rotational element 109, as show in FIG. 7. FIG. 7 shows a perspective view of the first rotational element 109 of the disappearing suspension column 101 where the first rotational element 109 attaches to load 102. The first rotational element 109 is attached to the load 102 in any suitable manner. For example, the first rotational element 109 may be bolted, fastened, adhered, welded or otherwise attached to the load 102. Like the second rotational element 105, the flexible support members 103 are attached to arms of the gimbal structure of the first rotational element 109 and are individually pivotable. As shown in FIG. 7, the first rotational element 109 rotates and follows the second rotational element 105. As described above, the rotation of the first rotational element 109 may be measured and compared to the second rotational element 105 to prevent twisting, bending or undesired rotational movement of the suspension columns 101. For example, the rotation may be measured so that any incorporation of any foreign object or collision can be detected and the system may be brought to a safe operational mode. In this embodiment, hard foreign objects can rub on the outside of the spinning flexible support members 103 without damage and cannot penetrate the disappearing suspension column 101. If a soft foreign object (fabric, string, or similar object) winds up in the first rotational element 109, the encoder will instantly go out of the tolerance window and the brakes will be applied to the motor 107.

Figure 8:
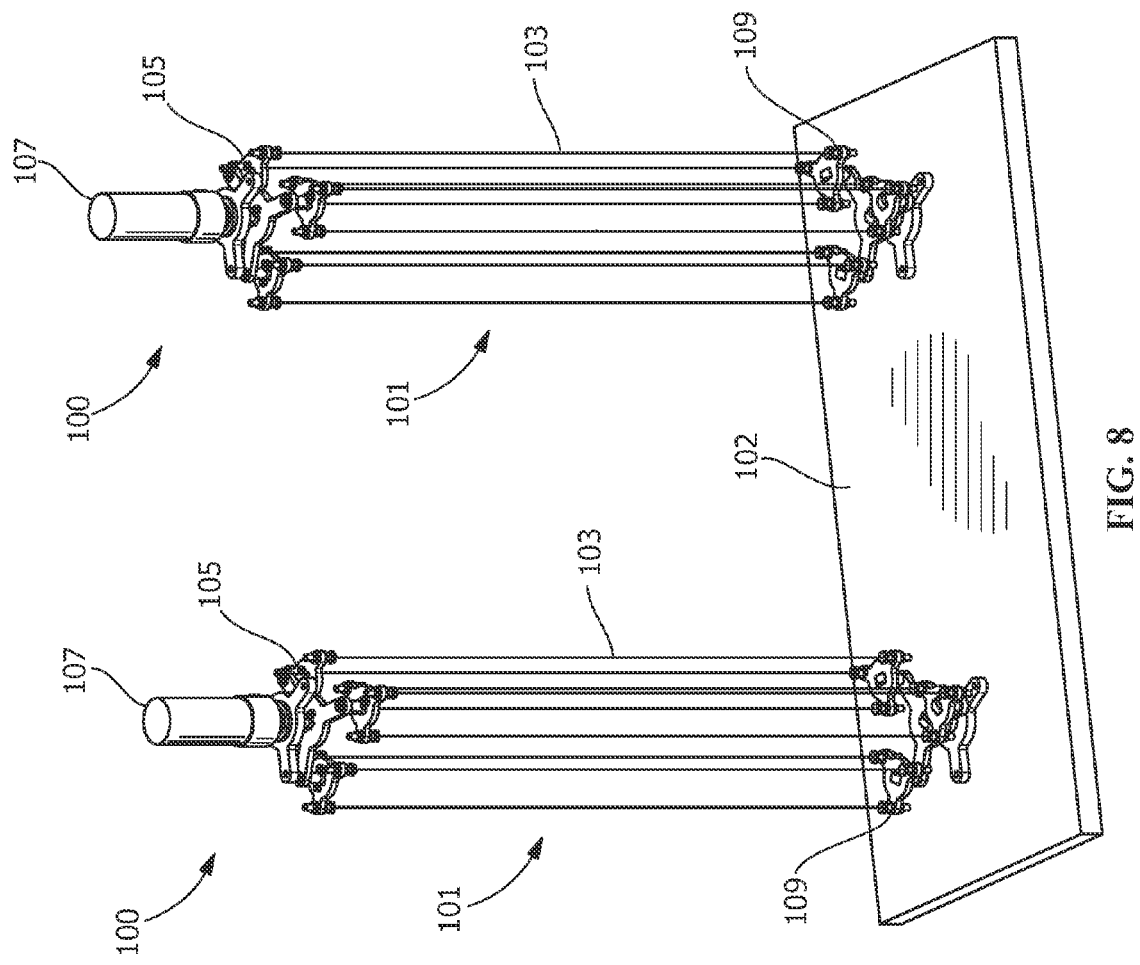
FIGS. 8-10 shows a schematic view of a suspended flying system according to an exemplary embodiment of the disclosure rotating to render suspended columns visually transparent.
Figure 9:
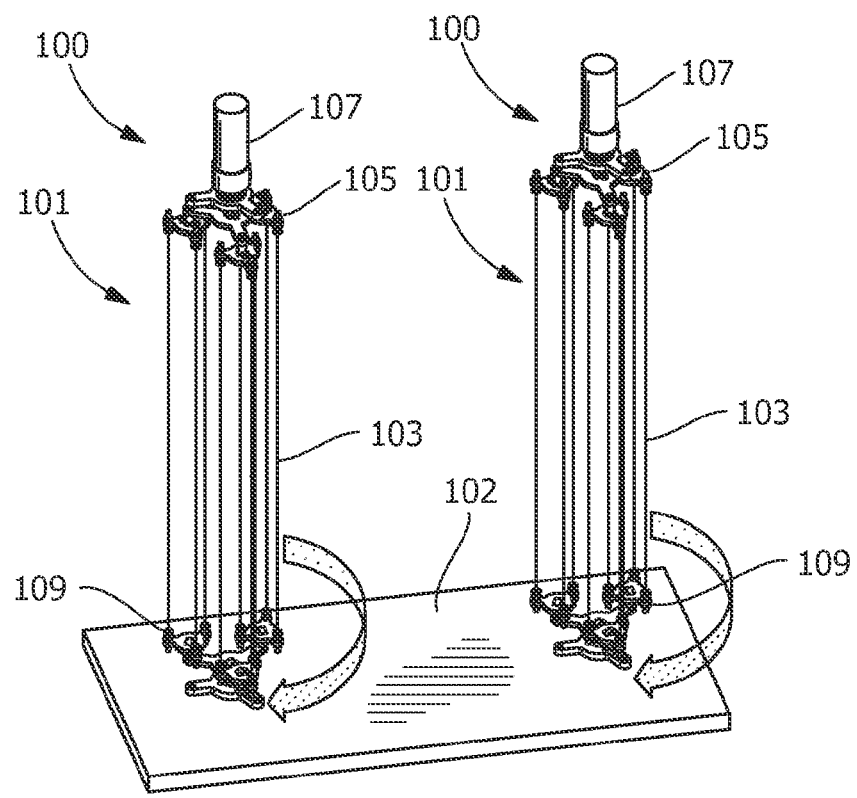
Figure 10:
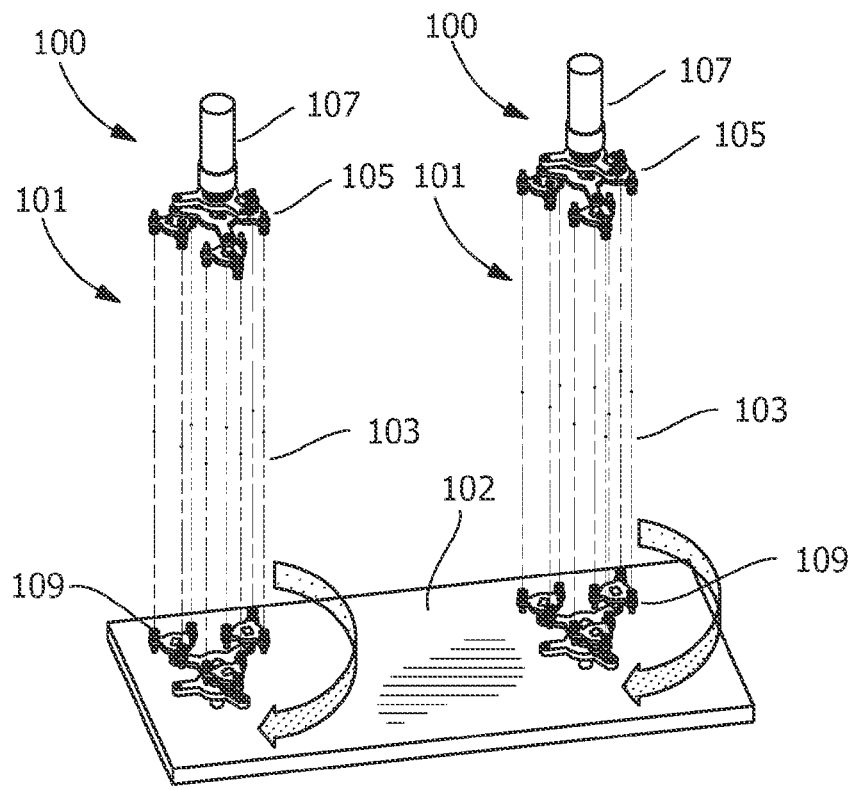

FIGS. 8-10 illustrate a method of rendering the flexible support members 103 visually transparent. As shown and described herein, flexible support members 103 are rendered visually transparent by movement of the flexible support members 103. While rotational motion is shown, other types of movement, such as oscillatory, vibratory or other movement are also suitable for rendering the flexible support members 103 visually transparent. The flexible support members 103 are rendered invisible or partially invisible to a viewer viewing the apparatus as a spectator or audience member by movement of the flexible support members 103. In another embodiment, the flexible support members 103 are visually transparent to one standing within a few feet of the apparatus. In addition to being visually transparent, the disappearing suspension column 101 preferably makes little or no noise perceptible to one viewing the apparatus. In FIG. 8, the system 100 is shown in a static position prior to rotation. In FIG. 9, the disappearing suspension columns 101 are rotated and the visibility of the flexible support members 103 begins to reduce. In FIG. 10, the disappearing suspension columns 101 are at a desired rotational speed and the flexible support members 103 are visually transparent.

Figure 11:
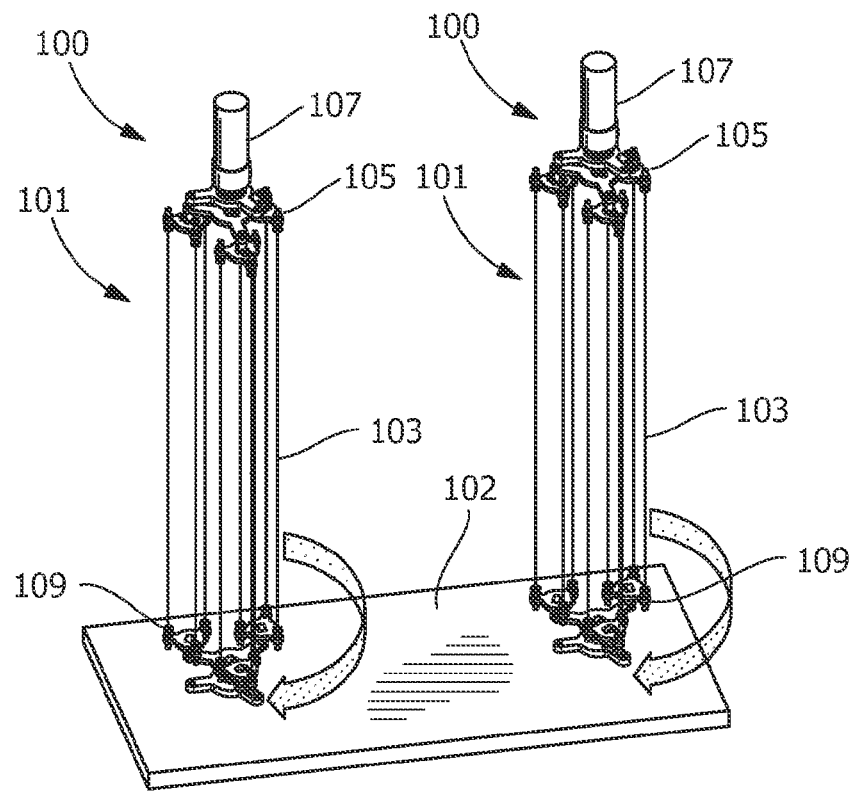
FIGS. 11-12 shows a schematic view of a suspended flying system according to an exemplary embodiment of the disclosure rotating to render suspended columns visually transparent and lifting the load.
Figure 12:
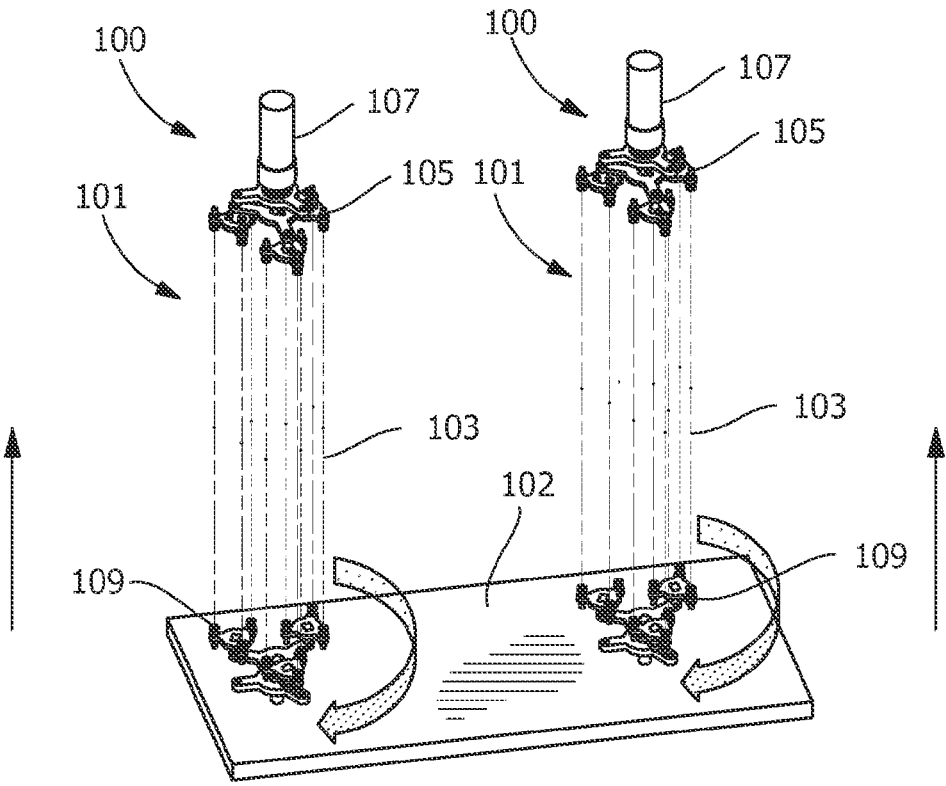

FIGS. 11-12 illustrate another embodiment where the length of flexible support members 103 between the second rotational element 105 and the first rotational element 109 is varied to provide an elevational motion. FIG. 11 shows the system 100 in a static position. FIG. 12 shows the rotational movement of the disappearing suspension columns 101 and the lifting or upward motion of the load 102.

Figure 14:
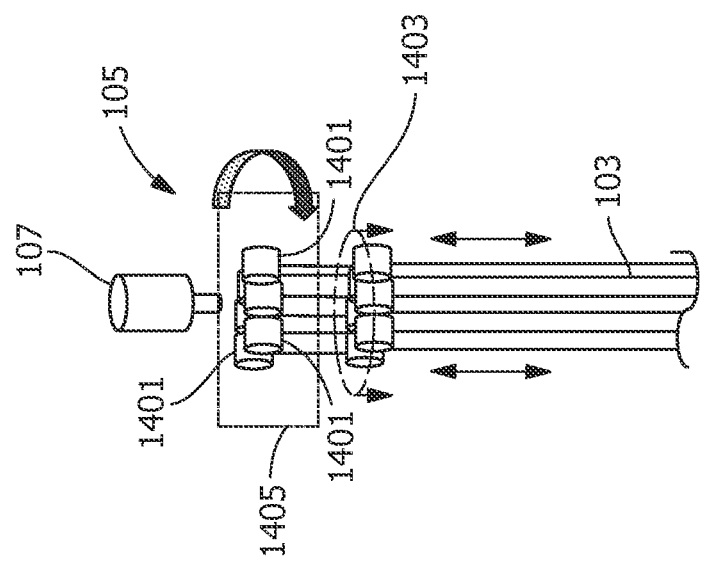
FIG. 14 shows a schematic view of an second rotational element of a suspended flying system according to another exemplary embodiment of the disclosure.
Figure 13:
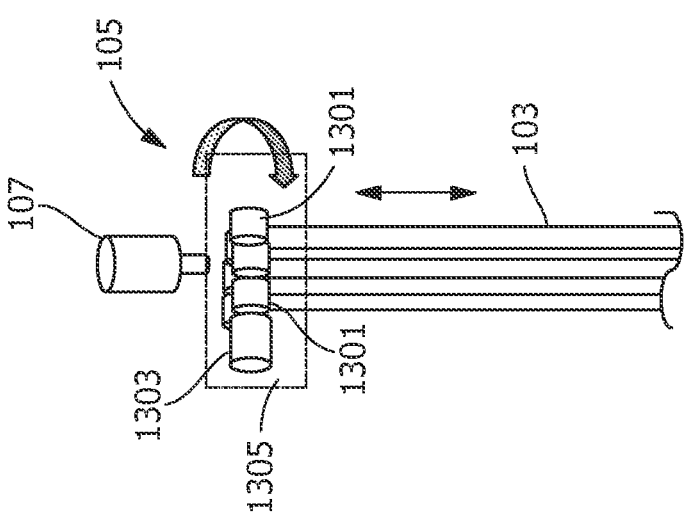
FIG. 13 shows a schematic view of an second rotational element of a suspended flying system according to an exemplary embodiment of the disclosure.

FIGS. 13 and 14 show embodiments of second rotational element 105 allowing for the drawing in of flexible support members 103. FIG. 13 shows a series of drums 1301 onto which flexible support members 103 are drawn. The drums 1301 are driven by winch motor 103. The entire assembly 1305 is rotated by motor 107. FIG. 14 shows an arrangement of sheaves 1401 wherein the flexible support members 103 are looped through the sheaves 1401 and returned to the first rotational element 109 (not shown in FIG. 14). An adjustment ring 1403 provides movement of sheaves 1401 with respect to each other drawing the flexible support members 103 into and/or toward the second rotational element 105, allowing for lifting or upward motion of the load 102. While not shown, balancing weights, functional equipment, such as brakes, balancing weights and clutches may also be provided. In one embodiment, both motors and slew bearing are mounted to a compact pod on each corner of an "H" shape marionette frame under a separate ring gear rotate on the end of the arm, which also tracks, rotates, and lifts.

Figure 15:
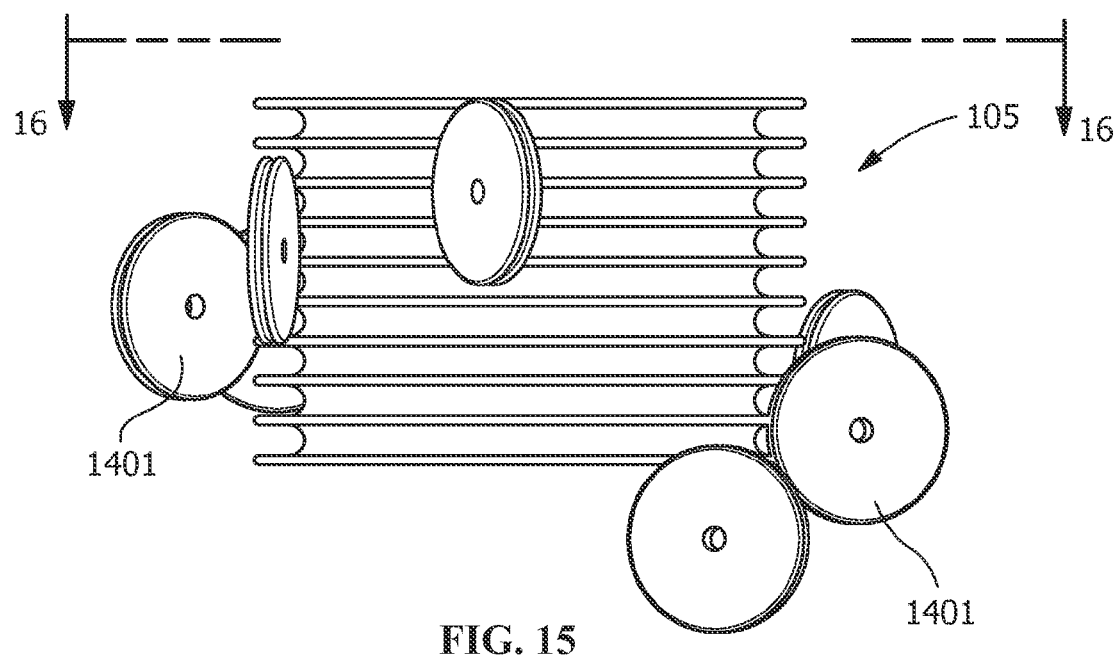
FIG. 15 shows a perspective view of an second rotational element of a suspended flying system according to another exemplary embodiment of the disclosure.
Figure 16:
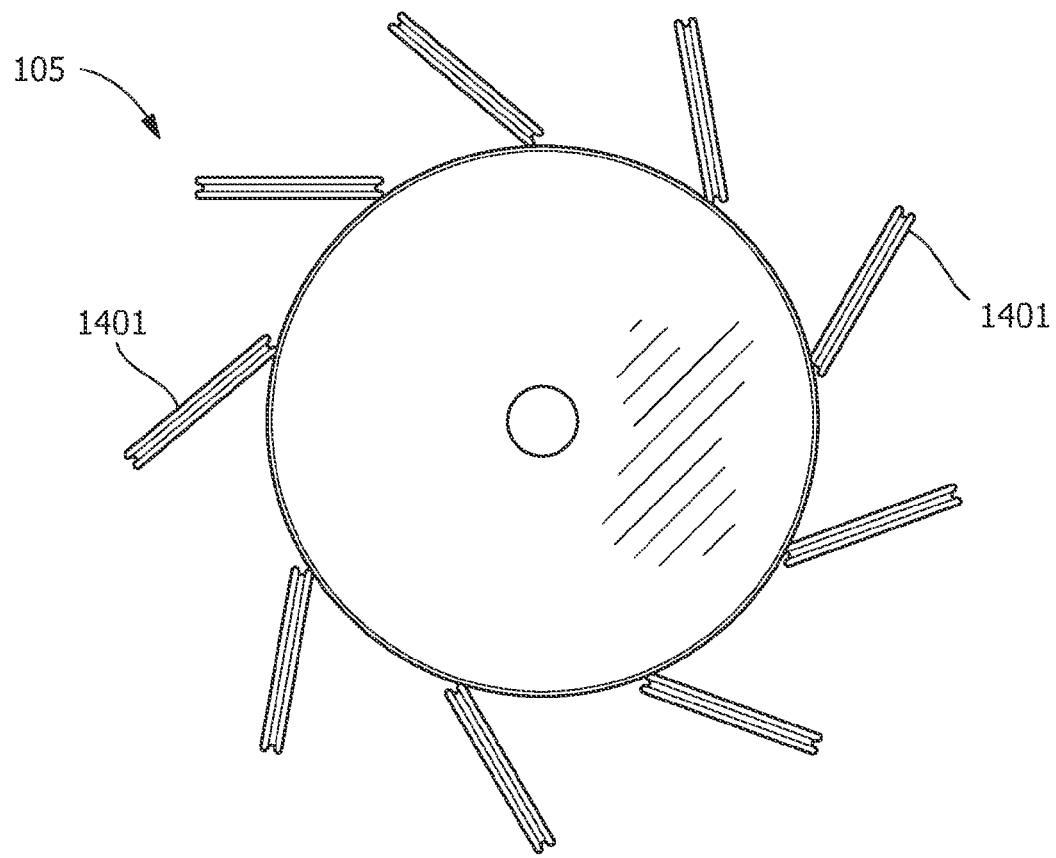
FIG. 16 shows a top view of the second rotational element of the suspended flying system shown in FIG. 15.

FIGS. 15 and 16 show an embodiment to lift/pitch/yaw the load 102 to fly upstage-downstage on an arm instead of just in a cross stage slot. The flexible support members 103 reel in and out from a winch above, while still spinning at high speed. In the embodiment shown in FIGS. 15 and 16, the second rotational element 105 includes a rotating drum that rotates the sheaves 1401 and provides the motion to the flexible support members 103. In one embodiment, the top of flexible support members pass over small 2 inch sheaves to wrap around a central, vertical, nine groove, 5 inch diameter capstan drum. In this embodiment, the drum is on the output of a 2 hp AC servo motor with integral brake and absolute encoder, no gearbox. The sheaves are mounted at varied heights to align with the drum grooves in a cylindrical frame around the drum. In another embodiment, the cylinder is mounted to a toothed slew bearing belt driven by a second 2 hp AC servo motor with integral brake and absolute encoder.

Figure 17:
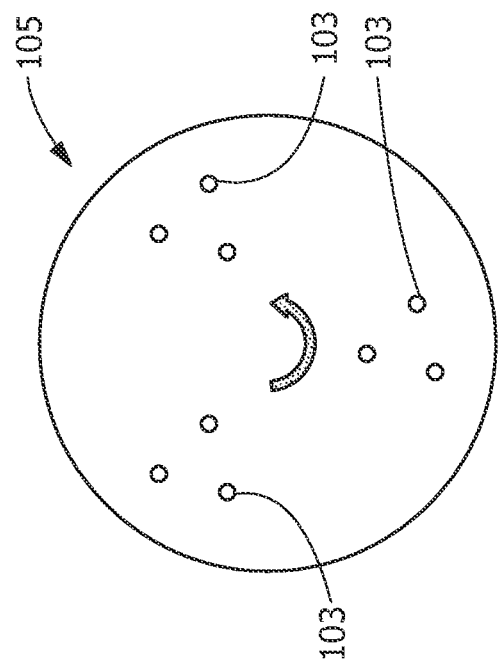
FIG. 17 shows a top view of an second rotational element of a suspended flying system according to another exemplary embodiment of the disclosure.
Figure 18:
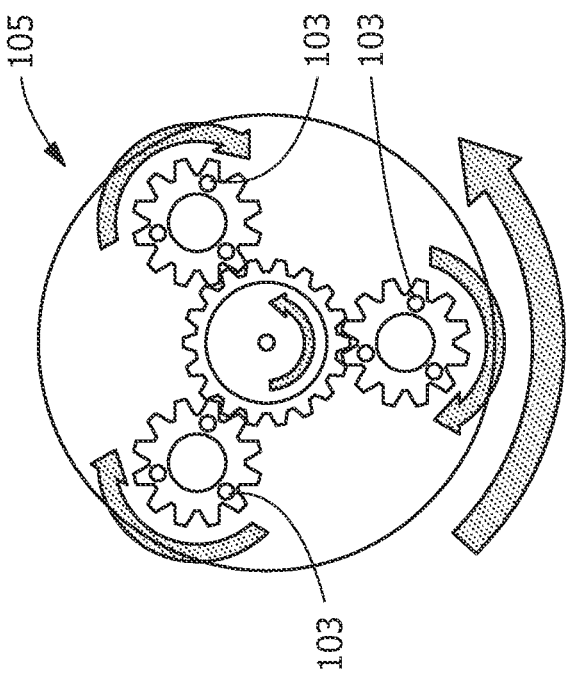
FIG. 18 shows a schematic view of an second rotational element of a suspended flying system according to another exemplary embodiment of the disclosure.

FIGS. 17 and 18 show alternate arrangements of the second rotational element 105. As shown the flexible support members 103 are attached to the second rotational element 105 by fasteners or any other suitable device or method. In FIG. 17, the rotational and motion of the flexible support members 103 is provided by an second rotational element 105 in a geared arrangement. For example, the geared arrangement can provide planetary motion or similar motion to the flexible support members 103. The dual rotational motion provides greater variation of the motion to further prevent visibility of the flexible support members 103. In FIG. 18, the rotation and motion of the flexible support members 103 is provided by the rotation of an second rotational element 105 in a plate arrangement. In one embodiment, the system 100 is operated such as to raise the load 102 up to 20 feet at 2 feet per second (fps), the motor speeds up to 1100 rpm, while the sheave cylinder and first rotational element 109 continue at 1000 rpm. To lower the load up to 20 feet at 2 fps max speed, the drum motor slows to 900 rpm, while the sheave cylinder and lower gimbal structure (i.e., first rotational element 109) continue at 1000 rpm. This way, only the lightweight drum and cylinder are the only spinning items with low inertia. The motors and feedback are fixed, so there is no commutation.

FIGS. 19 and 20 show alternate arrangements of placement of flexible support members 103. In FIG. 19, the flexible support members 103 are aligned in rotation for a small number of common rotational paths 1901. In FIG. 20, the flexible support members 103 are misaligned to provide a large number of rotational paths 1901. FIGS. 19 and 20 show just illustrations of possible arrangements of flexible support members 103, which can be provided in a greater or less alignment than shown. The greater misalignment of the rotational paths results in less visibility of the flexible support members 103 as they are rotated. The misaligned rotational motion provides greater variation of the motion to further prevent visibility of the flexible support members 103.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for suspending a load from visually transparent flexible support members comprising:
   suspending a load from a plurality of flexible support members, the plurality of flexible members being attached to a first rotational element attached to the load and a second element attached to a support;
   moving the plurality of flexible support members at a sufficient speed and over a sufficient distance to render the flexible support members visually transparent; and
   moving the load within a space with pitch, yaw and roll.

2. The method of claim 1, wherein the plurality of flexible support members are arranged into at least one suspension column.

3. The method of claim 1, wherein the plurality of flexible support members are selected from the group consisting of carbon steel wire, Aramid fibers, Vectran fibers, carbon fibers, UHMWPE fibers and combinations thereof.

4. The method of claim 1, wherein the moving includes rotating the flexible support members.

5. The method of claim 1, wherein the moving includes vibrating the flexible support members.

6. The method of claim 1, wherein the moving includes moving the flexible support members in an oscillatory motion.

7. The method of claim 1, further comprising measuring rotation at the first rotational element.

8. The method of claim 7, further comparing the rotation at the second rotational element to the rotation at the first rotational element and altering the motion in response thereto.

9. The method of claim 8, wherein the altering the motion includes stopping the motion of the flexible support members.

10. A suspended flying system comprising:
    a load suspended by a plurality of flexible support members, the plurality of flexible support members being attached to a first rotational element attached to the load and a second rotational element attached to a support; and
    a motor operably connected to the first rotational element to provide sufficient motion to the plurality of flexible support members to render the flexible support members visually transparent;
    wherein the load is movable by the system within a space with pitch, yaw and roll.

11. The system of claim 10, wherein the plurality of flexible support members are arranged into at least one suspension column.

12. The system of claim 10, wherein the plurality of flexible support members are selected from the group consisting of carbon steel wire, Aramid fibers, Vectran fibers, carbon fibers, UHMWPE fibers and combinations thereof.

13. The system of claim 10, wherein the first and second rotational elements provide rotational motion to the flexible support members.

14. The system of claim 10, wherein the first and second rotational elements provide vibratory motion to the flexible support members.

15. The system of claim 10, wherein the first and second rotational elements provide oscillatory motion to the flexible support members.

16. The system of claim 10, further comprising a sensor arranged and disposed to measure rotation at the first rotational element.

17. A process for displaying an object within a space, the process comprising:
    with regard to an object being viewable by an observer at a fixed location and having a first elongate member and second elongate member secured thereto, the object exerting a tension force on each of the first elongate member and the second elongate member and each of the first elongate member and the second elongate member having a longitudinal extent extending generally parallel to a reference axis associated with the respective elongate member, a proximate end secured to the object in a manner that permits the respective elongate member to move relative to the object as the elongate member moves around the reference axis, and a distal end movably secured to an advancing device operable to advance the elongate member around its reference axis, displacing the object from an initial location to a subsequent location within the space such that the observer observes the object along an initial line of sight in a manner and thereafter along a subsequent line of sight, the displacement movement of the object occurring such that, following the displacement of the object from the initial location to the subsequent location, the observer subsequently observes the object along the subsequent line of sight and this subsequent line of sight is angularly offset from the initial line of sight, with the object undergoing a change of orientation relative to the observer in that the respective portion of the surface of the object visible to the observer along the subsequent line of sight is different than the respective portion of the surface of the object visible to the observer along the initial line of sight;

while the observer is observing the object along the initial line of sight, repetitively advancing each of the first elongate member and the second elongate member around its reference axis through full loops of advancing movement in a manner in which, during each full loop of advancing movement, the first elongate member, at one instance, at least partially overlaps the second elongate member as viewed along the initial line of sight of the observer and, at another instance, does not overlap the second elongate member, wherein the first elongate member and the second elongate member are continuously rendered visually transparent to the observer as a result of the advancing movement of the first elongate member and the second elongate member;

displacing the object from the initial location to the subsequent location within the space; and while the observer is observing the object along the subsequent line of sight, repetitively advancing each of the first elongate member and the second elongate member around its reference axis through full loops of advancing movement in a manner in which, during each full loop of advancing movement, the first elongate member, at one instance, at least partially overlaps the second elongate member as viewed along the subsequent line of sight of the observer and, at another instance, does not overlap the second elongate member, wherein the first elongate member and the second elongate member are continuously rendered visually transparent to the observer as a result of the advancing movement of the first elongate member and the second elongate member, whereupon the object has a different orientation relative to the observer as viewed along the initial line of sight than its orientation as viewed along the subsequent line of sight and the cyclic overlapping and non-overlapping dispositions of the first elongate member and the second elongate member continuously occur at each disposition of the object along the initial line of sight and along the subsequent line of sight.

* * * * *